May 15, 1928.  1,669,507

J. T. DICKSON

PRIME MOVER AND CLUTCH

Filed Feb. 11, 1927

INVENTOR.
James T. Dickson
BY
J W Shelley
ATTORNEY.

Patented May 15, 1928.

1,669,507

UNITED STATES PATENT OFFICE.

JAMES T. DICKSON, OF LOS ANGELES, CALIFORNIA.

PRIME MOVER AND CLUTCH.

Application filed February 11, 1927. Serial No. 167,445.

The present invention relates to electric motors and the like, as well as to the direct application to electric motors and the like, of clutches of the type set forth in my copending applications, Serial Nos. 85,426 and 102,924, Patent Serial Nos. 1,618,643 and 1,618,644.

The present invention has for its principal object the provision of a prime mover which will take up its load gradually without overload or faltering.

In the said co-pending applications I have described clutches which may be applied to the driving shafts of prime movers, but it is an object of this invention to provide a complete unit which embodies the advantageous features of my improved clutch applied directly to such prime mover with a view to providing a complete self contained unit of lower first cost.

Usual electric motors comprise a shaft through which the torque is transmitted, a stator and a rotor or armature fixed to said shaft. If the shaft is connected directly with the load to be driven, the motor is subject to a considerable overload in first picking up the load, and in cases where the load is constant or excessive, it is necessary to employ a clutch so that the prime mover can attain considerable speed before the load is applied. In machinery such as is used for drilling or earth boring, it is practically impossible to pick up the load without a clutch, and with usual clutches the strain on the machinery and on the motor is excessive and fatiguing when the load is being applied.

It is therefore another object of my invention to provide a complete prime mover which will automatically and gradually pick up its load without overloading and without undue strain on the machinery being driven. It is also another object of the invention to provide an automatic prime mover which will release any sudden or undue load whereby damage to machinery, "twist off" of drill stem and like accidents may be prevented.

Still other objects and advantages will appear hereinafter and include simple, compact and rugged construction and proper enclosing of all parts against damage and foreign matter.

I have illustrated my invention by the accompanying drawings, in which I have shown one practical embodiment of my invention.

In the said drawings:—

Figure 1:
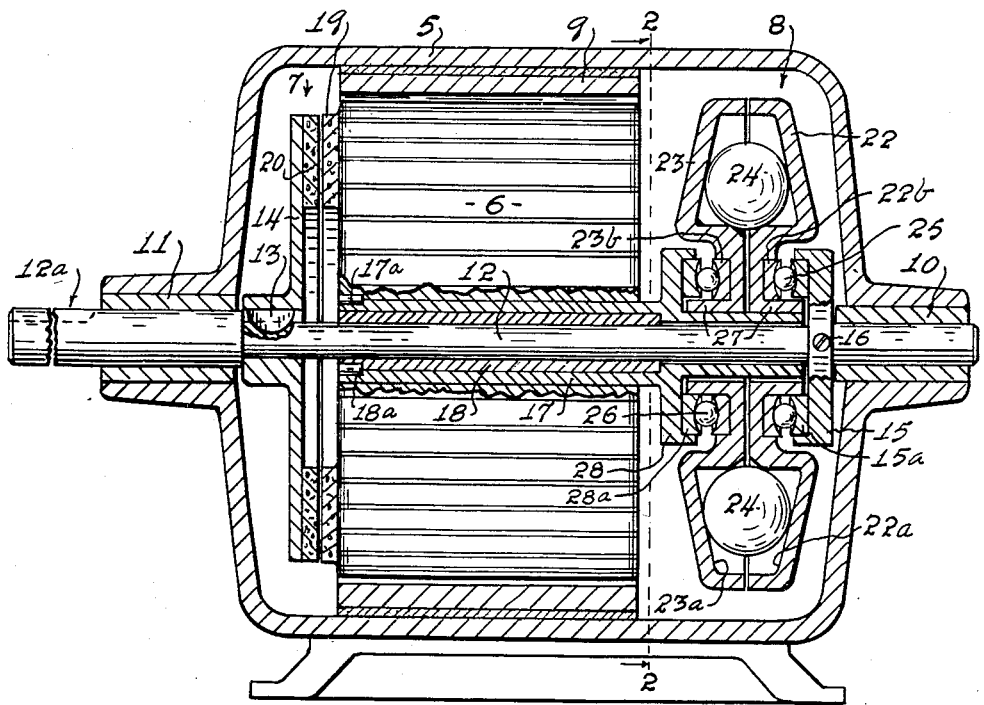
Figure 1 is a view in vertical section of such embodiment.
Figure 2:
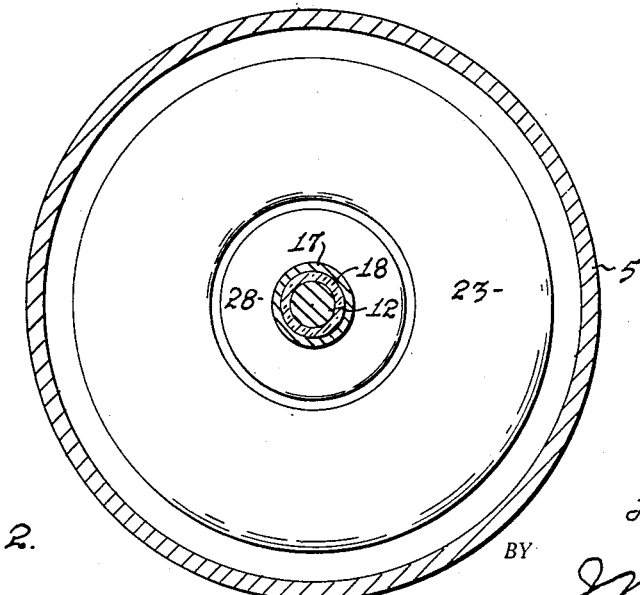
Figure 2 is a view in section seen on a line 2—2 of Fig. 1.

In carrying out my invention I provide a motor casing and stator, a motor shaft and an armature mounted loosely on said shaft. Obviously, by such arrangement, the armature or rotor will revolve of its own power but will not drive the shaft. Associated in structure with the armature I provide a clutch and an automatic centrifugally operated clutch actuating means, which latter is arranged to operate the clutch to cause the armature to drive the shaft only when it is capable of doing so efficiently and without overload. All parts are preferably enclosed directly in one casing which forms the motor casing and field support.

More specifically, 5 indicates a motor casing elongated to enclose an armature or rotor 6, a clutch 7 and the automatic clutch actuating means 8. The casing holds the field 9, and the field and casing will be referred to as the stator. It is understood that the armature 6 and the field 9 are of any usual construction and are merely shown diagrammatically herein, the invention being applicable to practically all types of windings common to electric motors, and of course the invention is equally applicable to any prime mover embodying a rotor and stator.

The casing 5 is provided with end bearings 10 and 11, respectively, which support the motor shaft 12. It is understood that the protruding portion of the motor shaft is to be connected directly or by suitable transmission to the load to be carried, but no clutch or disconnecting coupling or the like is required between the load and the motor shaft.

Within the casing there is provided the clutch disc 13, which is keyed to the motor shaft, as at 14. Also within the casing there is provided a collar 15 keyed to the shaft, as at 16. In the present invention it is only this said collar and the clutch disc which are keyed or directly connected with the shaft. The armature, in accord with a salient feature of my invention, is fixed to a quill 17, which is loose upon the shaft and capable of limited movement longitudinally of the shaft. The armature is provided with a lubricated bushing 18 between shaft 12 and the quill, but it is to be understood that the quill, bushing and armature are all secured permanently to each other to revolve as a whole.

It will be apparent now that when the field is energized and the armature reacts, that said armature will revolve freely around the motor shaft without driving same; the motor shaft remining stationary either by reason of its own inertia or by reason of the inertia of the load to which it is connected. The armature carries a friction member 19, capable of frictional driving engagement with a corresponding friction member 20, carried by the clutch disc 13. It is the object of the mechanism 8 to move the armature at the proper time along the shaft toward the clutch disc 13, so that the friction members 19 and 20 engage to cause the armature to drive the motor shaft 12.

The mechanism 8 embodies the features of, and performs similarly to, the clutch set forth in my co-pending application, Serial No. 102,924. It embodies opposed members 22 and 23, presenting outwardly converging surfaces 22ª and 23ª, respectively, between which are disposed the weights 24. The weights are free to be moved outwardly by centrifugal force to act on the converging surfaces to force the members apart. The members 22 and 23 are each provided with corresponding antifriction bearings 25 and 26, respectively, and are thereby loosely mounted on the quill 17. The quill in this instance is the driving member, while the motor shaft becomes the driven member; being driven by the quill when the friction members 19 and 20 are in frictional engagement.

Each member 22 and 23, respectively, is provided with an integral portion or collar 27; these collars being disposed intermediate of the antifriction bearings. The member 22 and its bearing is limited in movement along the quill by the collar 15 which is fixed to the shaft, while the member 23 and its bearing is limited in movement along the quill by a collar 28 which is integral with the quill. Collars 15 and 28 are spaced apart sufficiently so that when the mechanism 8 is revolving it is loose between said collars. The antifriction bearings are also loose upon the quill. Thus the clutch actuating means is loosely mounted so as to be frictionally driven by the quill.

The operation of my improved prime mover is as follows:—When the armature begins to revolve by reason of the energization of the field it revolves with its quill, upon the motor shaft without driving same.

The armature quickly attains normal speed but without having any resistance applied thereto. By reason of the mechanism 8 being loosely mounted on the quill it is driven by the armature at a retarded rate and is not accelerated to the approximate speed of the armature until an appreciable interval after the armature has attained constant speed. When the mechanism 8 and its weights reaches a predetermined speed, the weights act on the converging surfaces and force the members 22 and 23 apart. The end thrust set up by the members 22 and 23 is taken by the ball bearings which reduce friction sufficiently to still cause the members 22 and 23 to lag slightly with regard to the quill. The end thrust of the members 22 and 23, however, cause the armature and quill to be moved along the shaft until the members 19 and 20 engage. Thus the load of the shaft is taken gradually by the armature. At all times, by reason of the antifriction bearings, the frictional connection between the clutch actuating means 8 and the armature is slight, and any slight force acting to retard the mechanism 8 will result in frictional connection between the members 19 and 20 being reduced or broken. Any exterior means (not shown) may be employed for retarding the mechanism 8, as explained in the said co-pending application, to disconnect the armature from the motor shaft.

The prime mover, which I have illustrated and just described, is obviously capable of taking up its load gradually, and in case of over load, tending to slow down the motor shaft during operation, the centrifugal force of the weights will be lessened allowing the clutch to slip until the armature re-attains the proper speed.

It will be apparent now that my present invention enables me to incorporate the features and functions of my improved clutch directly in a prime mover to provide a complete self contained power unit, which unit is automatic in taking up its load and in releasing same at any time that the load becomes excessive and, retaking the load immediately it is capable of doing so.

While I have shown and described a specific embodiment of my invention, I do not limit myself to any specific construction or arrangement of parts and I may employ any construction or arrangement of parts for carrying out my invention, without departing from the spirit thereof, as set forth in the appended claims.

I claim:

1. In combination, a stator, a rotor, a shaft revoluble in said stator, a clutch disc fixed to said shaft; said rotor being revolubly mounted on said shaft and movable along said shaft into driving engagement with said clutch disc, and centrifugal means frictionally driven by said rotor for moving said rotor into driving contact with said disc.

2. In combination, a stator, a shaft revoluble in said stator, a quill revoluble independently on said shaft, a rotor fixed to said quill, a clutch disc fixed to said shaft; said rotor movable longitudinally of said shaft into driving engagement with said clutch disc, and centrifugally actuated means frictionally driven by said quill for moving said rotor into driving contact with said clutch disc.

3. In combination, a stator, a shaft revoluble in said stator, a quill revoluble independently on said shaft, a rotor fixed to said quill, a clutch disc fixed to said shaft; said rotor movable longitudinally of said shaft into driving engagement with said clutch disc, a collar carried by said shaft adjacent said quill, and laterally expansible centrifugally operated means between said quill and said collar; said centrifugally operable means being frictionally driven by said quill.

4. In combination, a stator, a shaft movable in said stator, a quill revoluble independently on said shaft, a rotor fixed to said quill, a clutch disc fixed to said shaft; said rotor movable independently of said shaft into driving engagement with said clutch disc, a collar carried by said quill adjacent an end thereof, a second collar spaced from the first collar and carried by said shaft, a pair of revoluble opposed members loosely encompassing said quill to be driven frictionally thereby; said members presenting surfaces converging toward each other radially outward, and movable weights between said members acting by centrifugal force to move said members apart.

JAMES T. DICKSON.